Patented June 9, 1942

2,285,886

UNITED STATES PATENT OFFICE 2,285,886

CRYSTALLIZATION OF HYDROXYCARBOXYLIC ACIDS

William W. Beck, Wilmington, and Clement H. Hamblet, Gordon Heights, Del., assignors to E. I. du Pont de Nemours & Company, Wilmington, Del., a corporation of Delaware No Drawing. Application June 13, 1940, Serial No. 340,242

4 Claims. (Cl. 260—535)

This invention relates to a process for the crystallization of hydroxy carboxylic acids and more particularly to the crystallization of hydroxyacetic acid by a process which gives exceedingly high yields of the crystalline acid.

A few factors influencing crystal formation from an unseeded solution are: rate of cooling, intensity of stirring, purity of solution, viscosity, temperature, and concentration. These factors roughly indicate the complexity of crystallization and when there is added the crystallization of compounds which deyhdrate or esterify to form a number of compounds in the presence as well as in the absence of water, which reactions occur during crystallization, problems are presented which are most difficult of solution.

Such problems are present in the crystallization of solutions of hydroxy carboxylic acids such, for example, as hydroxyacetic acid, hydroxybutyric acid, etc., since these acids, in solution or in the pure state at elevated temperatures, give anhydrides and esters by the interaction of the hydroxy and/or carboxyl group of one molecule with the carboxyl and/or hydroxyl group of another.

In the case of hydroxyacetic acid, for example, self-esterification to give polyhydroxyacetic acid (polyglycolide) and diglycolide may take place, or hydroxyacetic anhydride may be formed and the free hydroxyl groups of the latter may subsequently be esterified by the carboxyl groups of hydroxyacetic acid. These reactions may be represented thus:

esterification and polymerization are substantially eliminated. Other objects and advantages of the invention will hereinafter appear.

In accord with this invention, it has been found that hydroxy carboxylic acids and more particularly the lower aliphatic carboxylic acids such, for example, as hydroxyacetic acid and the hydroxybutyric acids, can be crystallized by a process which involves the removal of only free water from the aqueous solution of the acid under such conditions that substantially no polymeric acid or poly acids resulting from self-esterification are formed.

Crude hydroxy carboxylic acids, and particularly synthetic hydroxyacetic acid, contain anhydrides, internal esters, and other dehydration products. Crystallization is inhibited by the presence of these products and particularly by their presence in the form of relatively high molecular weight compounds. It has been found that prior to concentration, the crude acid mixture should be heated in the presence of water to hydrolyze the polymeric acids or poly acids present, thereby reconverting them to the free hydroxy acid. This phase of the process is hereinafter referred to as the hydration step, and comprises essentially the reversal of the dehydration reactions hereinbefore described. It is usually preferable to add to the acid sufficient water to give a solution containing from 30% to 60% by weight with an optimum ratio of approximately 50%. The thus diluted aqueous solution should then be heated preferably to the boiling point of the resulting solution and the

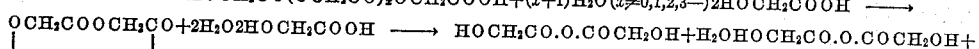

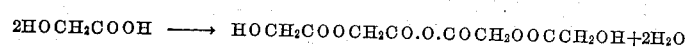

The presence of esters and/or anhydrides of these acids not only lowers the possible yield, but also inhibits crystal formation, and this is especially true in those instances in which the solution is contaminated with relatively high molecular weight compounds.

An object of this invention is to provide a process for the crystallization of hydroxy carboxylic acids. Another object of the invention is to provide a process for the crystallization of hydroxy aliphatic carboxylic acids wherein an exceedingly high yield of crystals is obtained. A further object of the invention is to provide a process for the crystallization of hydroxyacetic acid in which the difficulties due to internal heating continued until substantially all of the dehydration compounds present, anhydrides, esters, glycolides, polyglycolides, etc., are hydrated to the monomeric acid. This will require at the reflux temperature of such solutions approximately ¼ to one hour, a longer time being required if lower temperatures are used.

The resulting solution containing substantially no polymer or esters may be then subjected to the concentration step. This step is carried out by removing water from the hydrated crude reaction mixture under such conditions that dehydration and internal esterification are inhibited. This may be effected, it has been found, by evaporating the water present under reduced pressures and preferably under pressures ranging below 150 mm. and for optimum results pressures down to in the neighborhood of 15 mm. or lower. By removing the water present under these conditions, the temperature of the dehydration is such that there is little or no tendency for the anhydrides or polyesters to form.

Attention has been directed to the ease with which these acids react to form dehydration compounds and accordingly during the evaporation of water from the solution containing the acid which has been subjected to the dehydration step, care should be exercised that no more water be removed than will give, upon analysis, 100% acid and it is generally desirable to stay on the low side, that is, leaving in the order of 1 to 5% water present in excess. This precaution is taken to insure that even under the low temperatures of vacuum evaporation, there be no possibility of dehydration. Should the evaporation be continued after all free water has been removed, the water of esterification will then come over from the 100% acid to give anhydrides and esters which will defeat the potential advantages of the hydration step.

Crude synthetic hydroxyacetic acid obtained by certain synthetic processes give tarry by-products which are difficult to remove. It has been found that during the hydration step, not only are the esters and anhydrides converted to the acid, but also the tars, and other contaminating substances present in such crude acids, are precipitated and can be readily removed by filtration. Moreover, if during this hydration and clarifying step filter charcoals or other filter aids are present, there will be obtained, after heating and filtering, an aqueous solution of hydroxyacetic acid which is substantially colorless and free from contaminating substances.

It is essential, if high yields are to be obtained, that substantially no esters, anhydrides, or other dehydration products should be formed during the concentration step, and as low temperatures inhibit their formation, it is advantageous, from this standpoint, to operate at low temperatures. Water withdrawing agents may be used, if desired, for this purpose and especially those which form azeotropes with the water and are immiscible with hydroxyacetic acid, such, for example, as benzene, toluene, and the like. Dry air or a dry inert gas may be bubbled through the solution, also, to increase the rate of concentration.

After the hydration and concentration steps, the concentrate is cooled to a temperature of from 65 to 15° C. and the crystals allowed to form with or without stirring.

Examples will now be given illustrating preferred forms of the invention but they will not limit the scope of its coverage. Parts are by weight unless otherwise designated.

*Example 1.*—Crude synthetic hydroxyacetic acid containing tarry materials, polyhydroxyacetic acid, and diglycolide containing approximately 85% hydroxyacetic acid by saponification was diluted with water to give approximately 47% hydroxyacetic acid by saponification. The resulting solution was boiled at one atmosphere pressure for approximately ½ hour and then subjected to a pressure of approximately 15 mm., the water being removed until there remained a substantially 95% hydroxyacetic acid by saponification. During this vacuum evaporation step, the temperature of the solution was not allowed to exceed approximately 50° C. The thus hydrated and dehydrated solution was then allowed to cool with stirring at a rate of from 1° to 2° C. per hour, to 25° C. and there was obtained, after centrifuging, washing, and drying, a better than 75% yield of hydroxyacetic acid crystals.

*Example 2.*—Crude synthetic hydroxyacetic acid was diluted with its own weight of water and treated three times with 2% decolorizing charcoal. With each treatment, the dilute solution was heated under reflux for ½ hour and then the charcoal filtered off. The final color of the solution was very light and analyzed 57.8% hydroxyacetic acid. 430.3 parts of the solution was distilled at 15 mm. with a maximum pot temperature of 50° C. until the loss of weight was 182.8 parts. The calculated loss of water to produce 100% acid was 183.0 parts. The liquid substantially 100% acid was poured into a tared receiver. Crystallization was started as soon as the liquid was cooled to 60° C. In 12 hours the crystals were filtered off, washed with ether, and were dried by suction for 2 hours. From 242 parts of crystals plus liquid, 184.5 parts of colorless crystalline hydroxyacetic acid was obtained giving a yield of 76%.

*Example 3.*—450 parts of methyl hydroxyacetate and 470 parts of water were charged to a still provided with a fractionating column. The charge was refluxed at atmospheric pressure for one hour, after which methanol was withdrawn at such a rate that the vapor temperature at the head of the column was maintained at 64–66° C. At the end of five hours the theoretical quantity of methanol, 160 parts, had distilled. The residue, 760 parts, was a 50% aqueous solution of hydroxyacetic acid. The solution was allowed to cool to 30° C. and a vacuum of 20 mm. applied. Water was distilled off at a maximum pot temperature of 60° C. until 369 parts of water had distilled. The residue, 391 parts, was a 97% aqueous solution of hydroxyacetic acid. The concentrated solution was removed from the still and allowed to cool with stirring to 25° C. in 2 hours. The slurry of crystals and mother liquor was centrifuged, giving 247 parts of crystalline hydroxyacetic acid, a 65% yield.

It will be appreciated that although batch processes have been described in the examples, a continuous process may be used wherein the mother liquor is returned either to the dehydrated substantially 100% hydroxy carboxylic acid just prior to dehydration or it may be returned to the hydration step in order that any polyhydroxyacetic acids or esters formed during crystallization may be hydrated to the acid prior to recrystallization.

We claim:

1. A process for the crystallization of hydroxyacetic acid from a crude synthetic reaction product containing it which comprises adding thereto sufficient water to give a solution containing approximately 50% water, heating said solution to a temperature between 65° and 100° C. for from ¼ to 1 hour, filtering therefrom any precipitated material, subjecting the resulting solution to vacuum distillation at a pressure not substantially above 100 mm. until there remains from 0.1 to 5% of free water, cooling and crystallizing the hydroxyacetic acid, and subsequently recovering the resulting crystals from the mother liquor by centrifuging, washing, and drying.

2. A process for the crystallization of hydroxyacetic acid from a solution containing dehydration products of the acid which comprises heating an aqueous solution of the hydroxyacetic acid containing from 30 to 60% water until substantially all of the hydrated forms of hydroxyacetic acid have been converted to the acid, subjecting the thus hydrated hydroxyacetic acid to vacuum evaporation during which all but from 0.1 to 5% of the free water contained therein is removed, and subsequently cooling to a temperature between 65° and 15° C., and crystallizing the hydroxyacetic acid from the resulting product.

3. A process for the crystallization of hydroxyacetic acid from a crude synthetic reaction product containing it which comprises heating an aqueous solution of the crude synthetic reaction product containing from 30 to 60% water until substantially all of the dehydrated forms of hydroxyacetic acid have been converted to the acid, subjecting the thus hydrated hydroxyacetic acid to vacuum distillation during which all but from 0.1 to 5% of the free water contained therein is removed, cooling and crystallizing the hydroxyacetic acid, and subsequently recovering the resulting crystals from the mother liquor by centrifuging, washing, and drying.

4. A process for the crystallization of hydroxyacetic acid from a crude synthetic reaction product containing tarry materials, polyhydroxyacetic acid, diglycolide, and approximately 85% hydroxyacetic acid, determined by saponification, which comprises adding to the crude reaction product sufficient water to give approximately 47% hydroxyacetic acid by saponifiaction, refluxing the resulting solution for approximately one-half hour and then subjecting it to a pressure of approximately 15 mm. until there remains substantially 95% hydroxyacetic acid, slowly cooling the concentrate with stirring to a temperature of approximately 25° C. and subsequently separating the hydroxyacetic acid crystals formed.

WILLIAM W. BECK.
CLEMENT H. HAMBLET.